United States Patent [19]

Bauer

[11] 3,971,588

[45] July 27, 1976

[54] FRAME FOR THE BODY OF A VEHICLE

[75] Inventor: Andreas Bauer, Fallersleben, Germany

[73] Assignee: Volkswagenwerk Aktiengesellschaft, Wolfsburg, Germany

[22] Filed: June 20, 1974

[21] Appl. No.: 481,069

[30] Foreign Application Priority Data

July 17, 1973 Germany............................ 2336213

[52] U.S. Cl. .......................... 296/28 R; 280/106 R
[51] Int. Cl.² ........................................ B62D 21/00
[58] Field of Search ............... 296/28 R, 28 F, 35 B, 296/28 J; 280/106 R; 180/82 R, 64 R

[56] References Cited
UNITED STATES PATENTS

| | | | |
|---|---|---|---|
| 1,659,017 | 2/1928 | Clark | 180/64 R |
| 2,389,907 | 11/1945 | Helmuth | 296/28 J |
| 2,933,341 | 4/1960 | Muller | 296/28 R |
| 3,108,836 | 10/1963 | Deckert | 296/28 F |
| 3,697,124 | 10/1974 | Wessells | 296/28 R |
| 3,718,364 | 2/1973 | Fischer et al. | 296/28 R |
| 3,827,525 | 8/1974 | Felzer | 296/28 R |

FOREIGN PATENTS OR APPLICATIONS 838,827  6/1960  United Kingdom............... 296/28 R

*Primary Examiner*—Robert J. Spar
*Assistant Examiner*—Winston H. Douglas
*Attorney, Agent, or Firm*—Brumbaugh, Graves, Donohue & Raymond

[57] ABSTRACT

A frame for the body of a vehicle, specifically a passenger automobile, has a box-like framework which includes a roof frame, a base frame, corner columns connecting the roof frame and base frame, and at least one supporting structure. The supporting structure is essentially aligned in the longitudinal direction of the vehicle outside the box-like framework and comprises two symmetric fork-shaped girders with their outer prongs connected to corner columns, their inner prongs connected to the base frame and their struts connected to a bumper.

8 Claims, 1 Drawing Figure

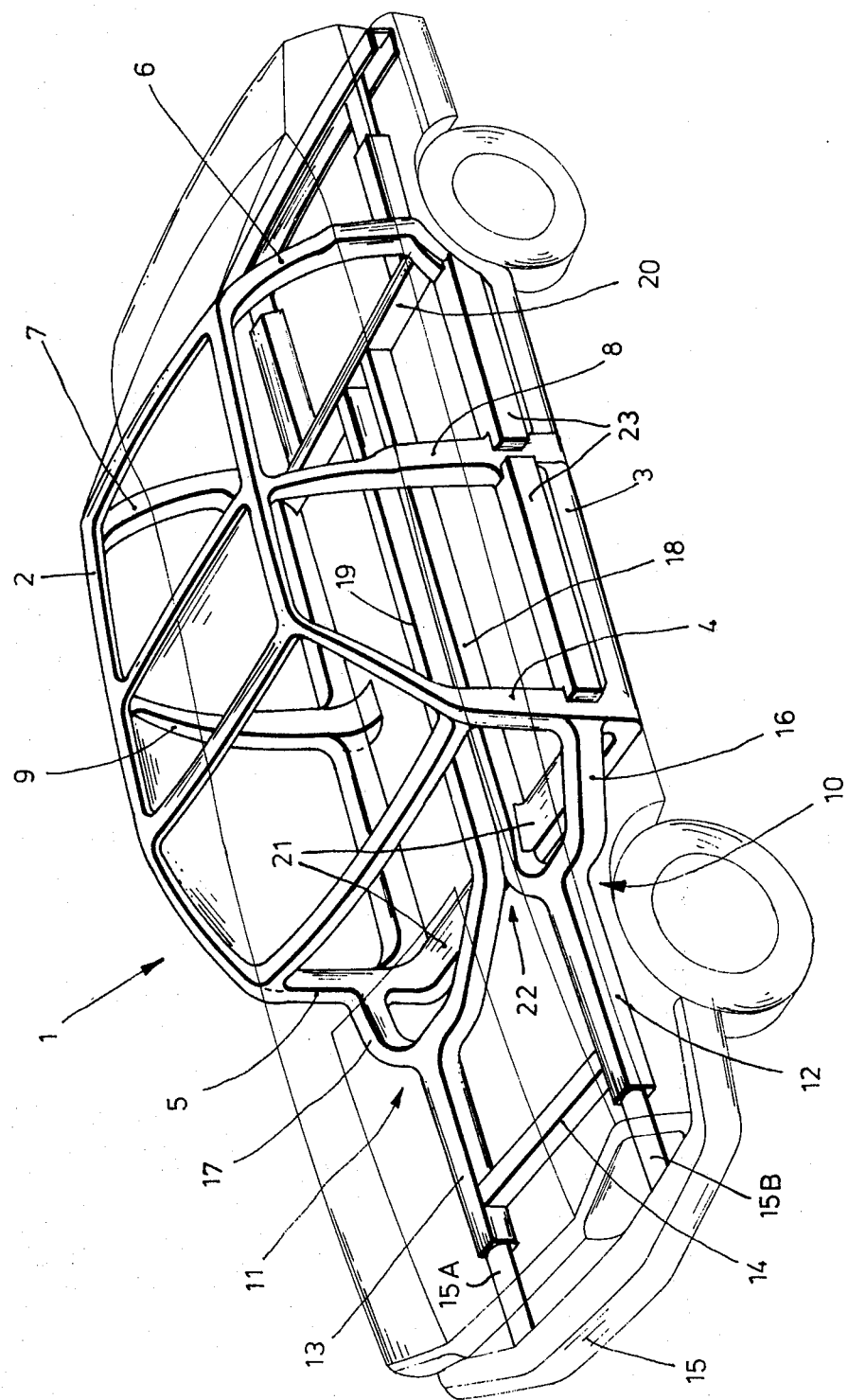

FRAME FOR THE BODY OF A VEHICLE

BACKGROUND OF THE INVENTION

This invention relates to vehicle frames and, more particularly, to frames for passenger automobiles that provide safety for the occupants.

Previously known box-like frames for vehicles are provided with a supporting structure of longitudinal runners which are at the height of the bumper near the front of the vehicle, bend downward in the region of the so-called splash board and continue towards the rear of the vehicle below its bottom. In the bending zone these longitudinal runners always have a large bending moment which is difficult to control without large expenditures of material and resulting high costs. When force is exerted during a collision on these longitudinal runners in the longitudinal direction of the vehicle, the floor in the region of the bend tends to buckle out and therefore absorbs only a little of the energy of the collision. Consequently, the safety of passengers could be improved if the vehicle frame were constructed in such a manner that the forces acting on the supporting structure in the longitudinal direction of the vehicle, would be distributed more uniformly over the stable box-like framework.

On the one hand, such a construction would allow the kinetic energy to be dissipated better and, on the other hand, the individual frame parts could have smaller dimensions, resulting in a weight and cost reduction. Moreover, in vehicle construction it has always been the aim of designers to achieve the lowest possible weight per horsepower, i.e., the ratio of the weight of the vehicle to the installed capacity. In addition, it would be desirable during a collision to limit the energy-dissipating deformations of the frame to those parts of the vehicle outside the passenger space.

SUMMARY OF THE INVENTION

The present invention is directed to a structure for spreading the forces of a collision over the frame of a passenger vehicle in such a way that parts of the frame do not protrude into the passenger space. This is achieved by a novel fork-like structure for the supporting structure of the vehicle.

In an illustrative embodiment of the invention a box-like framework having a roof frame, a base frame and connecting corner columns is joined to a supporting structure comprised of two longitudinal symmetrically arranged fork-shaped girders with their outer prongs (i.e., facing the outside of the vehicle) bearing against corner columns, their inner prongs bearing against the base frame and their struts bearing against the vehicle bumper. Also, the prongs of each fork are connected with each other by traverse means, which prevent the prongs from bending during a collision and the driving assembly (e.g. engine) from intruding into the passenger space.

In accordance with a further development of the invention, the fork-shaped girders are arranged suitably inclined towards the longitudinal center line of the vehicle. In this manner, they do not take up any space in the passenger area proper, but bear with their inner prongs against the base frame below the passenger space. The two fork struts may be braced with respect to each other by means of a web, which can also accommodate the driving assembly.

BRIEF DESCRIPTION OF THE DRAWINGS

The foregoing and other features of the present invention will be more readily apparent from the following detailed description and the drawing, in which shows a prospective contour of a passenger vehicle with the front part of its frame constructed according to the invention.

DESCRIPTION OF AN EXEMPLARY EMBODIMENT

In the drawing the box-like framework 1, which surrounds the passenger space, includes a roof frame 2, and a base frame 3. The roof and base frames are connected by front corner columns 4 and 5, rear corner columns 6 and 7 and two door columns 8 and 9. A supporting structure is constructed of two fork-shaped girders 10 and 11, and a web 14 rigidly connected with the two struts 12 and 13 of the fork-shaped girders. The free ends of the fork struts 12 and 13 are connected to shanks 15A and 15B of front bumper 15.

The fork-shaped girders have their outer prongs 16 and 17 connected to the end faces of the front corner columns 4 and 5 at the level of the bumper. The girders 10 and 11 are inclined towards the longitudinal center line of the vehicle so that the inner prongs 18 and 19 are below the level of the outer prongs 16 and 17. In the embodiment shown the inner prongs are substantially longer than the outer prongs and extend toward the rear of the vehicle in the immediate region of the floor of the passenger space, e.g., in the frame tunnel that is normally present. Therefore, the inner prongs do not occupy any, or at least very little, of the area of the passenger space. The ends of the inner prongs are connected to a rear traverse 20 of the base frame 3.

In an alternative arrangement the fork-shaped girders may form a longitudinal girder with their extended inner prongs to replace traverse 20. However, in either case the prongs are to be held together in pairs. Also, the prongs of the fork-shaped girder may be stamped in part (i.e., one profile half each) from the walls of the body, such as the splash board, floor or wheel casing.

Also included in the base frame is a traverse 21 which is divided at its center. This traverse 21 is rigidly welded to the corner columns 4 and 5 as well as to the inner prongs 18 and 19. Thus, the traverse 21 constitutes a tension member or tie rod for the prongs of the fork-shaped girders 10 and 11, and prevents the fork prongs from bending (laterally) due to longitudinal force introduced into the frame as a result of a frontal impact. Rather, in such a case, the longitudinal forces are distributed uniformly over the box-like framework 1. At the same time, the traverse 21 limits the possible depth of penetration of any driving assembly located in the front of the vehicle (not shown in the drawing) during a collision.

It is possible to design the two inner prongs 18 and 19 together as one unit, and in the same manner, it is also possible for the traverses 20 and 21 to be constituted by a single traverse connecting two front or two rear corner columns with each other. In many cases it may be useful to connect the two parts of traverse 21 by an intermediate part 22 located between the inner prongs. This intermediate part 22 and the web 14 can then be used for the gear and/or engine suspension. Such a traverse located approximately in the plane of the vehicle floor, whether divided or undivided, acts like a tension member on the prongs so that when force is exerted on the supporting structure in the longitudinal direction of the vehicle, the prongs cannot bend laterally. At the same time, the traverse prevents the penetration of the driving assembly or any other larger organs outside the framework into the passenger space.

The invention may be applied to special advantage in vehicles in which the side doors are provided with longitudinal girders 23 at the level of the bumper. In such a case, longitudinal forces are distributed not only over the corner columns but also over the entire framework by way of the door columns 8 and 9.

While the invention has been particularly shown and described with reference to preferred embodiments thereof, it will be understood by those skilled in the art that various changes in form and details may be made therein without departing from the spirit and scope of the invention. In particular, the fork-shaped girders can be reversed and connected to the rear bumper.

I claim:
1. Frame for the body of a vehicle comprising:
   a roof frame;
   a base frame;
   at least two vertical corner columns joining the roof and base frames into a box-like structure surrounding a passenger space;
   a vehicle bumper with bumper shanks attached; and
   an underframe connected to the box-like structure comprising two substantially straight fork-shaped girders arranged symmetrically with respect to the longitudinal axis of the vehicle, said fork-shaped girders being arranged with an inclination towards the central longitudinal axis of the vehicle so that the outer prongs of the fork-shaped girders that face the outside of the vehicle are each connected to a separate vertical corner column on a level with the bumper and the inner prongs of the fork-shaped girders that face the center of the vehicle are connected to the base frame below the point where the outer prongs are connected to the vertical columns, the struts of the fork-shaped girders being connected to the bumper shanks and a traverse means of said base frame connecting the outer and inner prongs of each fork-shaped girder.

2. A frame as claimed in claim 1 wherein the inner prongs are longer than the outer prongs and the inner prongs extend along the bottom of the passenger space.

3. A frame as claimed in claim 1 wherein the inner prongs are attached to at least one transverse girder of the base frame located in the center of the vehicle.

4. A frame as claimed in claim 1 wherein the struts of the forked-shaped girders are connected by a web member adapted to accommodate a vehicle driving assembly.

5. A frame as claimed in claim 1 wherein the traverse means is composed of two structural members, each connecting the outer and inner prongs of respective fork-shaped girders.

6. A frame as claimed in claim 5 further including an intermediate member connecting the two structural members and being adapted to accommodate a vehicle driving assembly.

7. A frame as claimed in claim 1 wherein there are two front and two rear corner columns, the outer prongs being attached to the respective front corner columns, the struts being connected to the bumper, and the inner prongs extending below the passenger space and being attached to a rear transverse girder of the base frame.

8. A frame as claimed in claim 1 further including vertical door columns and longitudinal girders connecting the door columns with the corner columns at the level of the bumper.

* * * * *